Nov. 23, 1965        J. M. BAKER                3,219,173
                      CONVEYORS
Filed Aug. 13, 1963                          6 Sheets-Sheet 1
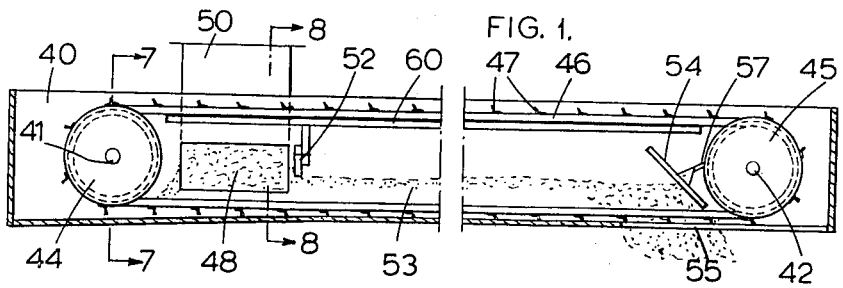
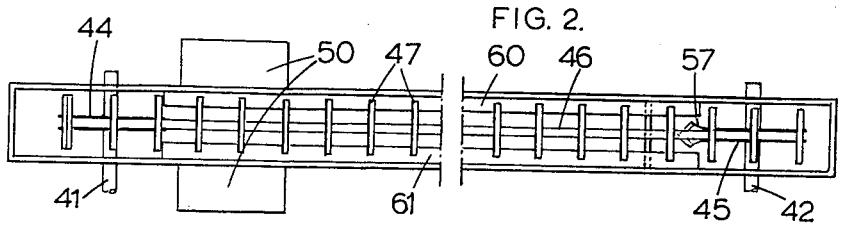
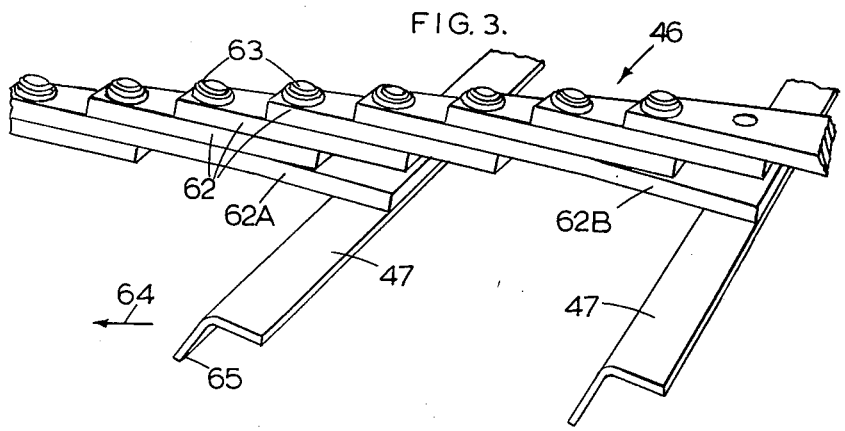
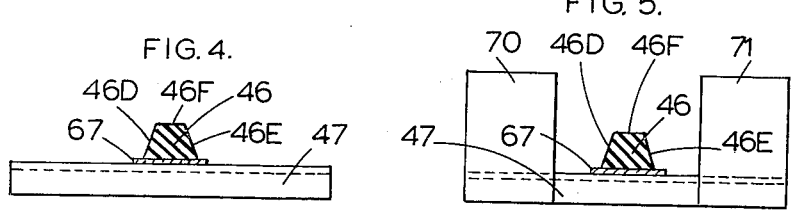
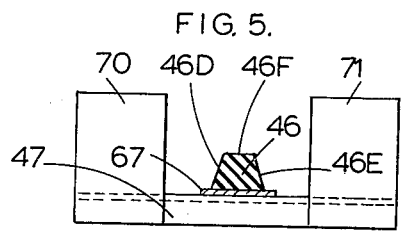

Nov. 23, 1965   J. M. BAKER   3,219,173
CONVEYORS
Filed Aug. 13, 1963   6 Sheets-Sheet 2

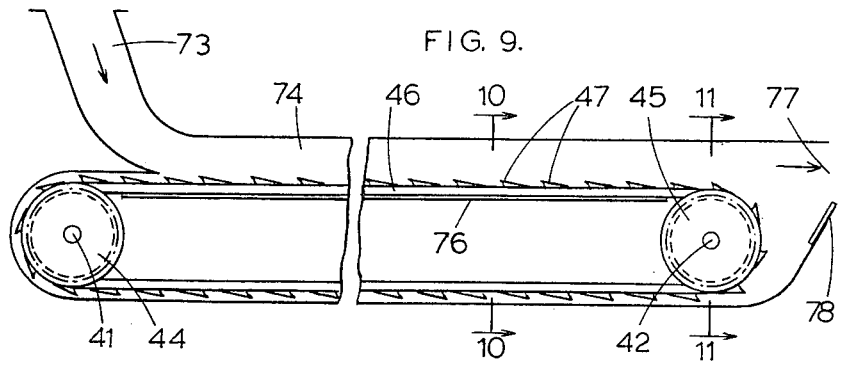
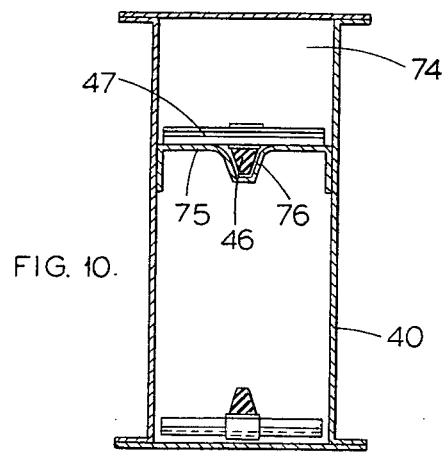
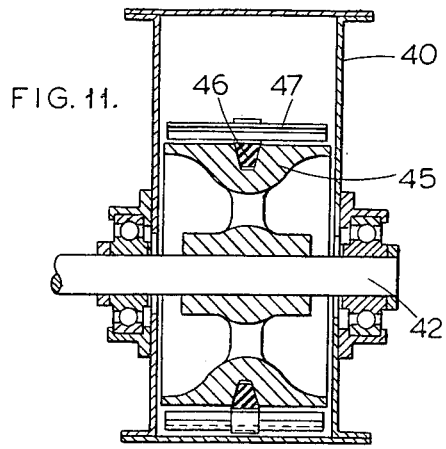

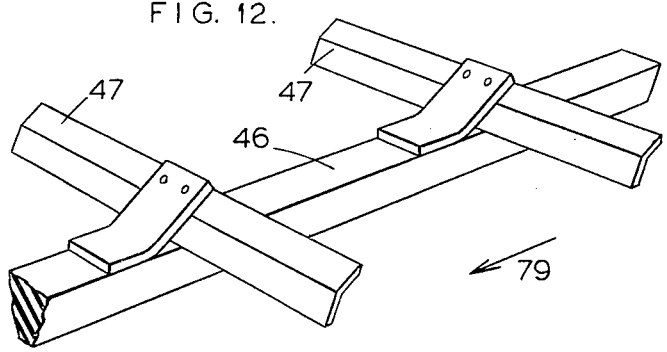
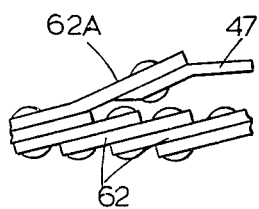 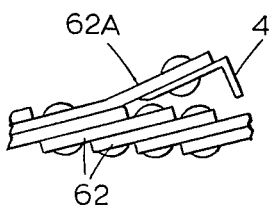 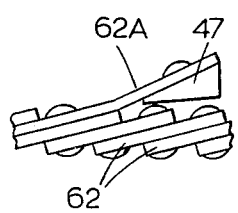

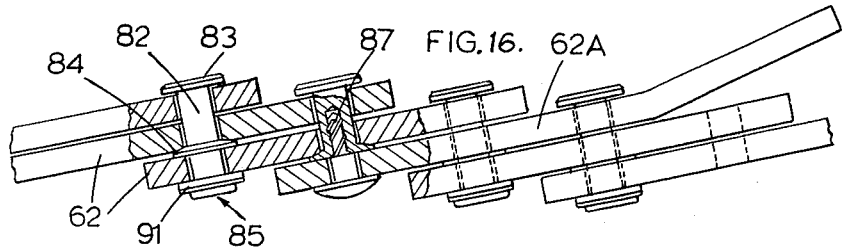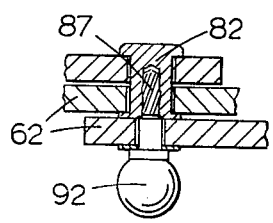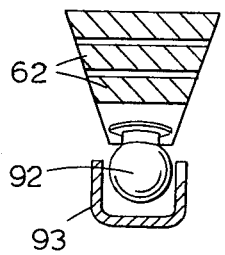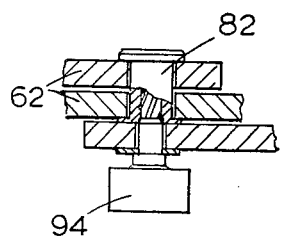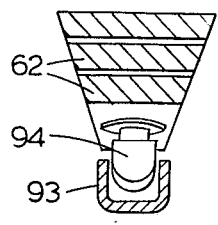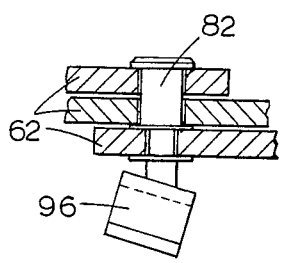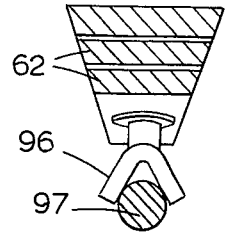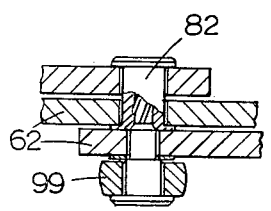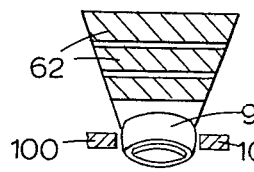

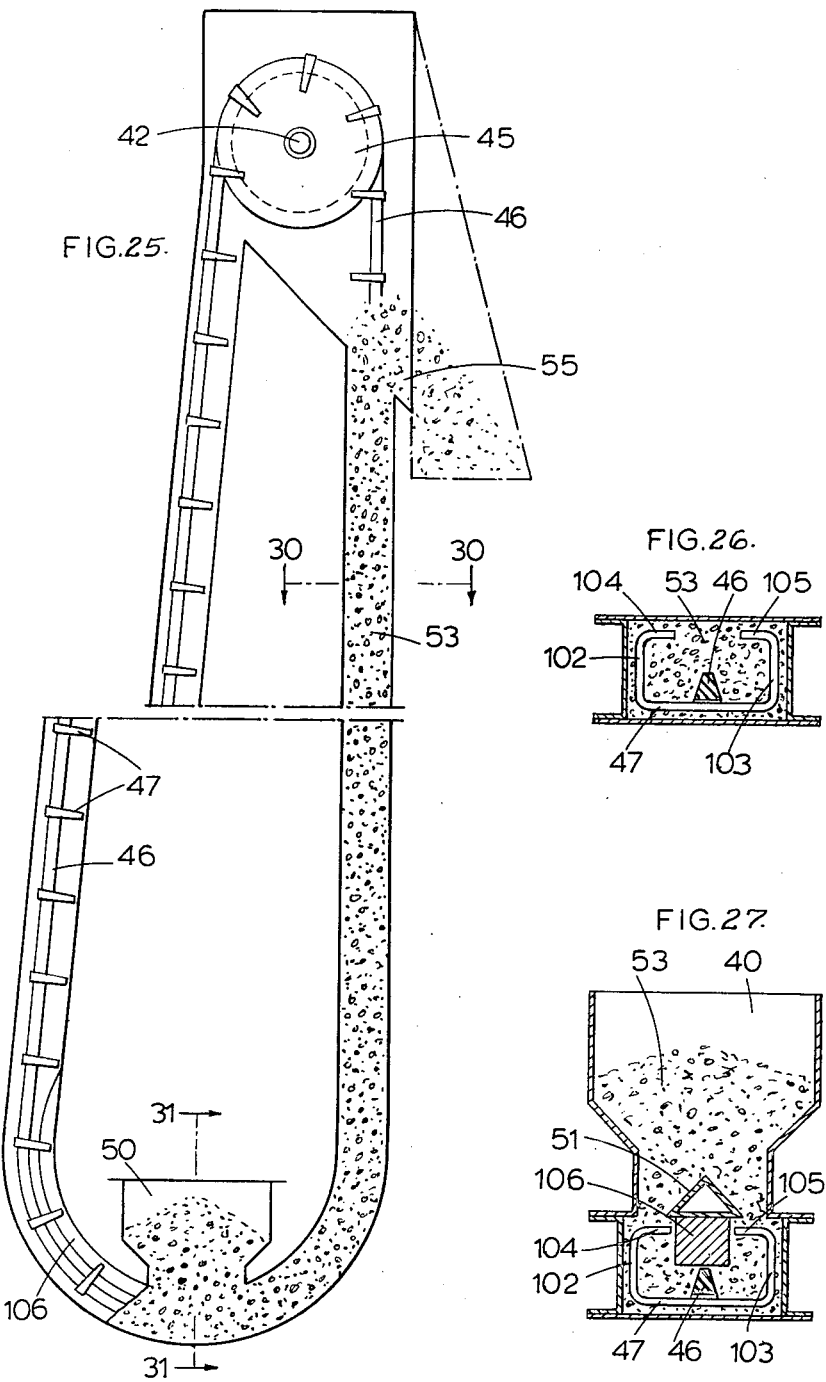

United States Patent Office

3,219,173
Patented Nov. 23, 1965

3,219,173
CONVEYORS
James Mundy Baker, Bristol, England, assignor to James Baker Conveyors Limited, Bristol, England
Filed Aug. 13, 1963, Ser. No. 302,768
Claims priority, application Great Britain, Aug. 13, 1962, 30,938/62
5 Claims.  (Cl. 198—174)

This invention relates to conveyors for conveyance of grain or other particulate material. It is well known to convey such material along a trough by means of an endless chain which carries transverse bars each extending on both sides of the chain, the chain being driven by a sprocket. The bars are welded to the link of the chain and the chain and bars run in the trough and conveys the material along the trough. The chain is expensive and heavy and its maximum speed is not as high as is desirable.

It was suggested many years ago to replace the chain by a steel wire and in experimental practice the bars were attached to the steel wire by clamps extending around the wire. This also necessitated driving by means of sprockets or by wheels having notches to receive the clamps. These experiments were however abandoned because the conveyor could not run at high speed and steel ropes running around small diameter wheels quickly frayed.

The problem of running endless conveyors at high speeds (e.g. over 400 and up to 1200 feet per minute or even faster) has remained unsolved.

The present invention has however solved this problem and conveyors of the present invention have been operated at high speed with conveyance of a large tonnage rate of grain, chicken meal, and other products.

According to the present invention the conveyor comprises a housing containing an approximately V-section endless belt running on a V-grooved driving wheel at one end and suitably supported at its other end, said belt having transverse bars attached thereto by attachment means which leave the driven faces of the V-belt free from projections.

Thus the long existing problem has been solved essentially by the use of a V-belt whereby the transverse conveyor bars can be attached by fixing means which do not project over the side surfaces of the V-belt and the side surfaces therefore present continuous friction surfaces which can be driven at high speed.

Figure 7:
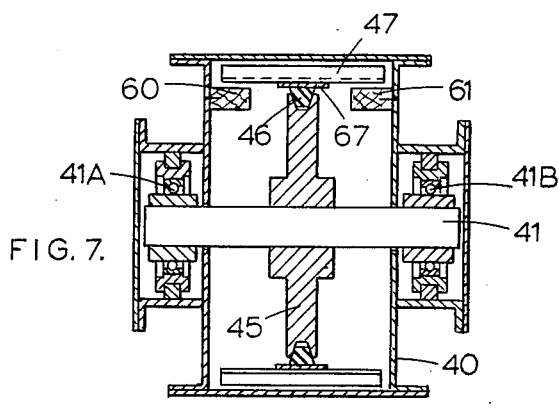
Figure 8:
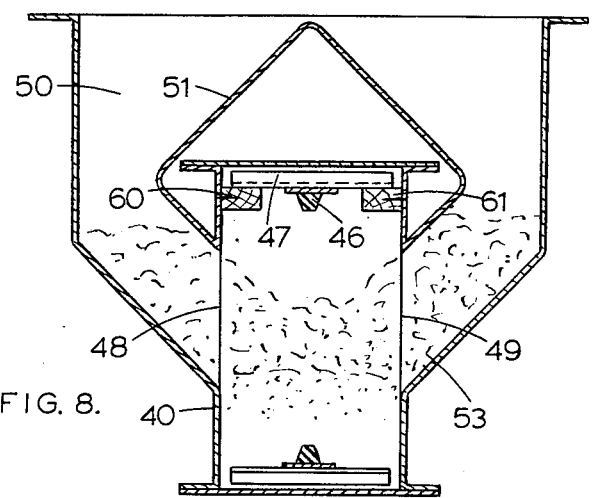

The invention will now be further described by way of example with reference to the accompanying drawings wherein:

FIGURE 1 is a vertical section of a conveyor made in accordance with the invention;
FIGURE 2 is a plan view thereof;
FIGURE 3 is perspective view of part of the belt and transverse bars;
FIGURE 4 is a sectional view on line 4—4 on FIGURE 6 and the latter is a perspective view of part of a modified form of belt;
FIGURE 5 is a sectional view similar to FIGURE 4 showing a modified construction;
FIGURES 7 and 8 are sectional views on lines 7—7 and 8—8 respectively on FIGURE 1, certain parts being omitted from FIGURE 7;
FIGURE 9 is a view similar to FIGURE 1 but showing a modified construction;
FIGURES 10 and 11 are sectional views on lines 10—10 and 11—11 on FIGURE 9;
FIGURES 12-15 show further modifications of the belt and bars to be described;
FIGURES 16-24 show various forms of belt fixing and guiding means to be described;

FIGURE 25 shows a vertical section of a vertical lift conveyor of the present invention; and
FIGURES 26 and 27 are sectional views on lines 30—30 and 31—31 on FIGURE 25.

In FIGURES 1 and 2 a housing or trough 40 carries spindles 41, 41 at opposite ends on which V-grooved pulley wheels 44, 45 are mounted. One of the wheels is driven and the other is free running. A V-belt 46 carries transverse conveyor bars 47 on its outer surface. The sides of the conveyor adjacent pulley 44 has inlet openings 48, 49 (FIGURE 8). A hopper 50 and bridge 51 feed material to the openings 48, 49 and the depth of the material on the bottom of the housing is controlled by an adjustable baffle 52. The material 53 is conveyed by the of a series of flexible strips 62 which are tapered in depth of the material being a continuously moving column. At the other end a baffle 54 directs the material to an outlet opening 55 in the bottom of the housing. A scraper 57 cleans the V-groove of pulley 45. The upper run of the belt is supported by bearing strips 60, 61 attached to the side walls of the housing. The spindle 42 may be mounted in bearings 41A, 41B adjustable lengthwise of the housing. The spindle 42 may be mounted in bearings and driven from an electric motor through a reduction gear.

FIGURE 3 shows a particularly successful method of fixing the bars 47. This is achieved by using a belt made of a series of flexible strips 52 which are tapered in depth and lengthwise. Each strip overlaps the next, leaving an end which is bolted or riveted by bolts or rivets 63 through adjacent layers. These may for example be all short strips e.g. of 2 to 4 inches each overlapping the next by about 55 to 75 percent of its length, three rivets passing through each strip. At appropriate positions a strip 62A, 62B etc. are made of greater length at its forward end and the free extending end of this strip carries a transverse bar e.g. wood, leather, rubber or synthetic rubber. The bar may be for example 4 to 8 inches wide or wide enough to suit the housing and may be about half an inch square cross-section or angle bar. The direction of travel is shown by arrow 64 whereby the free part 65 of the bar tends to dig into the material 53 and the pressure of the latter urges the bar towards the belt. The bolts of rivets 63 do not disturb the continuous side surfaces of the belt that engage the V-grooves of the pulleys.

Figure 6:
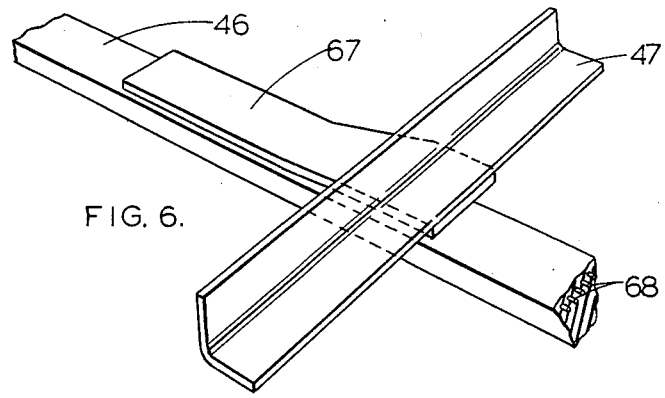

FIGURES 4, 5, 6 show an alternative construction in which a solid V-belt has flexible strips of rubber canvas, leather, synthetic plastic or the like 67 attached to it by adhesive (e.g. an epoxy resin). The belt 46 may be formed of rubber and canvas and may be strengthened by steel wires 68. In this construction also the side surfaces 46D, 46E of the belt are unbroken continuous surfaces engaged frictionally by the V-grooves of the pulleys.

It will be understood that the V belt and grooves do not have a sharp apex but the belt normally has a blunt surface 46F spaced from the bottom of the pulley grooves.

FIGURE 5 shows extensions 70, 71 attached to the ends of the bars 47 transversely thereof which are particularly useful for carrying material upwards.

FIGURES 9, 10 and 11 show a modification in which the housing 40 has a top chute 73 at one end leading to a channel 74 above the upper run of the belt where the material is conveyed over a support platform 75 the latter having a channel 76 to recive the belt 46. The housing has an outlet 77 at its uper part level with the channel 74 provided with an adjustable baffle 78. The pulleys 44, 45 extend across the width of the housing to form a continuous surface for the material. The chute 73 enables the material to achieve some speed in the direction of travel of the belt before reaching the belt and the material finally shoots out of the outlet 77 at high speed.

FIGURE 12 shows bars 47 suitable for the top-run conveyor of FIGURES 9–11 these bars being angle bars arranged also so that they tend to dig into the material and the pressure of the latter urges the bars towards the belt. The arrow 79 shows the direction of movement.

FIGURES 13, 14 and 15 are for the same purpose but the belt 46 is a link belt similar to FIGURE 3. In FIGURE 14 the bar 47 has its free edge bent down towards the belt to serve as a stop to limit the approach of the bar to the belt. In FIGURE 15 the bar 47 is a solid section bar.

FIGURE 16 shows a link belt in which a special form of rivet is used consisting of two parts viz. a hollow part 82 having a head 83 and flange 84 and a second part 85 having a head 86 and a drive-in self multi-start tapping screw 87. Washers 91 are provided between the head 86 and the belt. This rivet facilitates fixing especially in confined spaces.

As shown in FIGURE 17 the head of the rivet may be in the form of a hardened projection e.g. ball 92 which can run on a bearing rail or as shown can run in a bearing channel 93 whereby lateral guidance is provided.

FIGURES 19, 20 show a bar type head 94 and FIGURES 21 and 22 show a V-type head 96 running on a round bar 97. FIGURES 23, 24 show a friction roll 99 running between rails 100, 101.

FIGURE 25 shows a conveyor for elevating the material in a vertical or approximately vertical direction. The housing is in the form of a loop surrounding the belt. The belt runs round the pulley 45 at the top and around a curved bearing plate 106 at the bottom. The material is conveyed from the hopper 50 at the botom to a discharge opening 55 at the top. The bars 47 have transverse extensions 102, 103 at their ends and the ends of these extensions carry projections 104, 105 which extend inwardly towards each other into close proximity to the pulley.

The invention provides a conveyor of high speed and capacity which however is inexpensive and of small size and involves low maintenance and running costs.

I claim:
1. A conveyor comprising
   (a) a housing for supoprting conveyed material,
   (b) a belt having an approximately V-section, arranged within said housing as a pusher belt means having two ends,
   (c) at least one V-grooved driving wheel supporting the belt at one end thereof,
   (d) means for supporting the belt at the other end thereof,
   (e) said belt comprising a plurality of flexible strips tapered in length and depth and connected at intervals to form the belt in such a manner as to leave the driven faces of the V-belt free from projections,
   (f) transverse bars connected respectively to said flexible strips with at least two strips between each two bars at the free ends thereof and arranged to move in close proximity to at least a part of the inside surface of the housing,
   (g) said flexible strips being of such a length that the bars have some freedom of movement towards and away from the belt, and
   (h) said bars being inclined to said inside surface of the housing so that the pressure thereon from the conveyed material urges them towards said inside surface of the housing.

2. A conveyor as claimed in claim 1 wherein supporting runners are provided between said wheel and said means for supporting the other end of said belt, said bars running on said supporting runners.

3. A conveyor as claimed in claim 1 wherein the material is conveyed by the lower run of said belt at the bottom of said housing.

4. A conveyor as claimed in claim 1 wherein a support plate is provided at the upper end of said housing and a trough is provided in said support plate, said belt being located in said through so that the upper run of said belt conveys material along said support plate.

5. A conveyor comprising:
   (a) a housing, for supporting conveyed material,
   (b) a conveyor belt having an approximately V-section, arranged within said housing as a pusher belt means and having two ends,
   (c) at least one V-grooved driving wheel supporting the belt at one end thereof,
   (d) means for supporting the belt at the other end thereof,
   (e) said belt comprising a plurality of flexible strips tapered in length and depth and connected at intervals to form the belt in such a manner as to leave the driven faces of the V-belt free from projections, at least one strip having a cantilevered trailing end,
   (f) transverse bars connected respectively to said flexible strips at the free ends thereof and arranged to move in close proximity to at least a part of the inside surface of the housing,
   (g) said flexible strips being of such length that the bars have some freedom of movement towards and away from the belt, and
   (h) said bars being inclined to said inside surface of the housing so that the pressure thereon from the conveyed material urges them towards said inside surface of the housing.

References Cited by the Examiner

UNITED STATES PATENTS 2,383,932   9/1945   Brunner _____ 198—168

FOREIGN PATENTS 469,766   8/1937   Great Britain.
116,928   12/1925   Switzerland.

SAMUEL F. COLEMAN, *Primary Examiner.*

EDWARD A. SROKA, *Examiner.*